United States Patent
Breiter

(10) Patent No.: US 11,063,513 B1
(45) Date of Patent: Jul. 13, 2021

(54) BUCK-BOOST CONVERTER WITH POSITIVE OUTPUT VOLTAGE

(71) Applicant: Kazimierz J Breiter, Whitehall, OH (US)

(72) Inventor: Kazimierz J Breiter, Whitehall, OH (US)

(73) Assignee: Kazimierz J. Breiter, Whitehall, OH (US)

( * ) Notice: Subject to any disclaimer, the term of this patent is extended or adjusted under 35 U.S.C. 154(b) by 0 days.

(21) Appl. No.: 16/810,412

(22) Filed: Mar. 5, 2020

(51) Int. Cl.
   *H02M 3/156* (2006.01)
   *H02M 1/42* (2007.01)
   *H02M 3/158* (2006.01)

(52) U.S. Cl.
   CPC .......... *H02M 3/156* (2013.01); *H02M 1/4208* (2013.01); *H02M 3/1582* (2013.01)

(58) Field of Classification Search
   CPC ........... H02M 2001/0093; H02M 1/42; H02M 1/4208; H02M 1/4225; H02M 3/1582
   See application file for complete search history.

(56) References Cited

U.S. PATENT DOCUMENTS

| | | | | |
|---|---|---|---|---|
| 4,736,151 A * | 4/1988 | Dishner | ............... | H02M 3/1582 323/222 |
| 5,406,471 A * | 4/1995 | Yamanaka | ............. | H05B 41/28 363/124 |
| 6,104,624 A * | 8/2000 | Iwamoto | ................. | H02M 7/48 363/71 |
| 8,305,004 B2 * | 11/2012 | Shao | .................... | H02M 1/4225 315/247 |
| 2006/0097707 A1 * | 5/2006 | Inoshita | ............... | H02M 3/1582 323/222 |
| 2008/0259648 A1 * | 10/2008 | Ferianz | .................... | H02M 1/08 363/21.03 |
| 2011/0062889 A1 * | 3/2011 | Hoogzaad | .............. | G09G 3/342 315/294 |
| 2012/0319667 A1 * | 12/2012 | Nair | ..................... | H02M 3/1582 323/282 |
| 2013/0169242 A1 * | 7/2013 | Tsai | .................... | H02M 1/4225 323/207 |
| 2014/0169588 A1 * | 6/2014 | Petersen | ................... | H03F 3/68 381/120 |
| 2014/0210437 A1 * | 7/2014 | Chen | ................... | H02M 3/1584 323/271 |
| 2015/0366014 A1 * | 12/2015 | Itoh | ...................... | H02M 1/4225 315/200 R |
| 2016/0172863 A1 * | 6/2016 | Robbins | .................. | H02J 3/381 323/234 |
| 2018/0166976 A1 * | 6/2018 | Jiang | .................... | H02M 1/4208 |
| 2018/0205315 A1 * | 7/2018 | Giuliano | ............... | H02M 3/073 |
| 2019/0379288 A1 * | 12/2019 | Chaput | .................... | H02M 7/48 |

* cited by examiner

Primary Examiner — Fred E Finch, III

(57) ABSTRACT

This invention is an AC/DC one stage, one switch, and one inductor converter, to be used as an electronic power factor controller. This converter Buck-Boost topology is capable of converting a power line AC to a positive DC with a voltage conversion ratio close to unity. When used for a universal line voltage 85-250 VAC, it may have an output voltage close to 240 VDC instead of the traditional Boost converters having the d output voltage range of +380-400 VDC. The circuit's lower output voltage and its simplicity and low cost, make it a viable candidate to replace the Boost converters in any application, where lowering the output DC voltage along with lowering manufacturing costs are desirable.

2 Claims, 6 Drawing Sheets

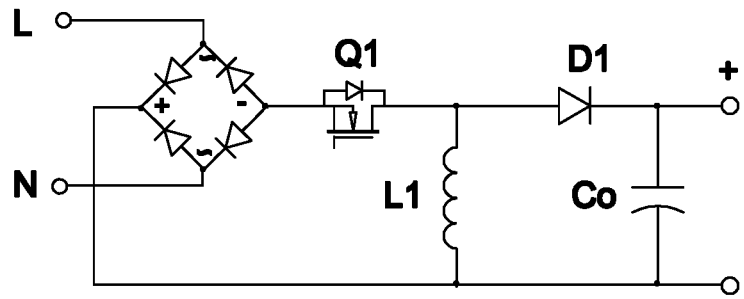
Fig. 1
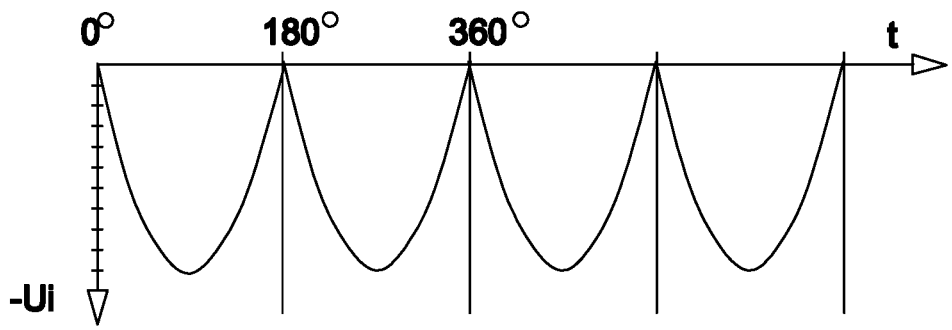
Fig. 2
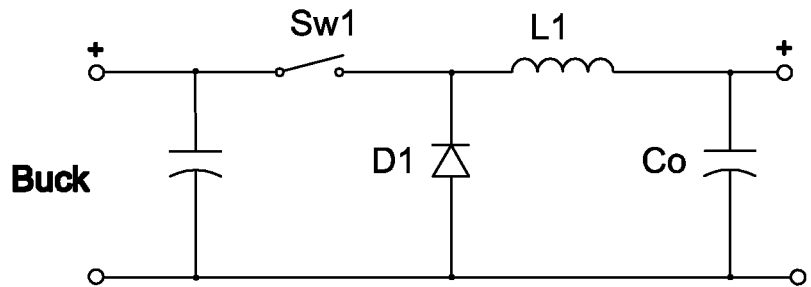
Fig 3 - Prior Art
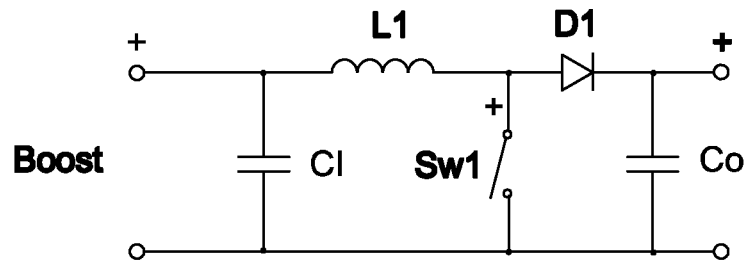
Fig. 4 - Prior Art

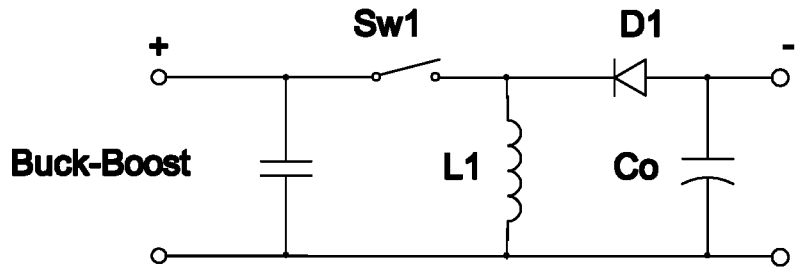
Fig 5 - Prior Art
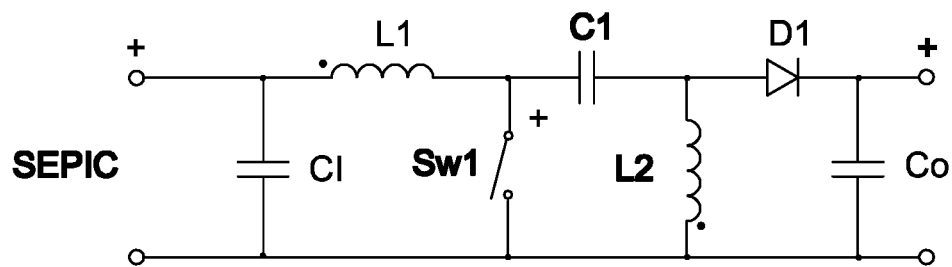
Fig. 6 - Prior Art
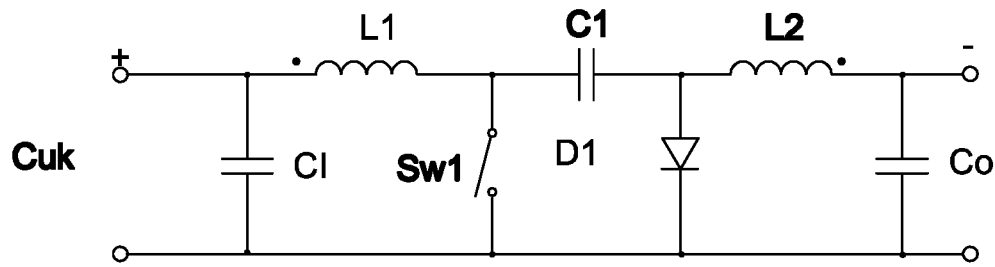
Fig. 7 - Prior Art
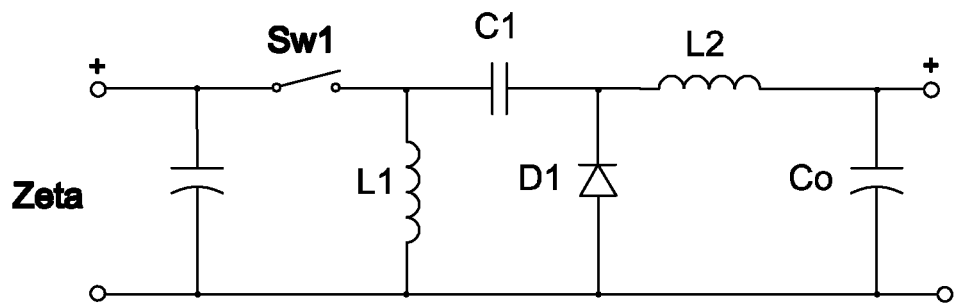
Fig. 8 - Prior Art

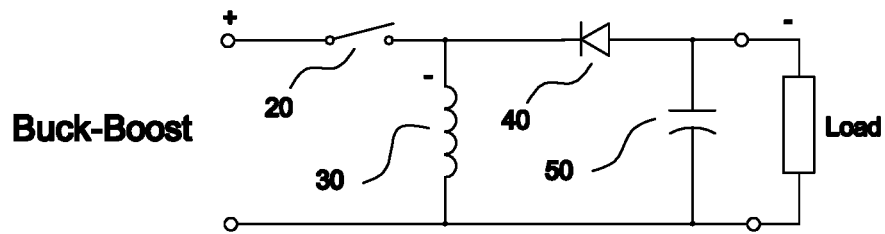
Fig. 9 - Prior Art
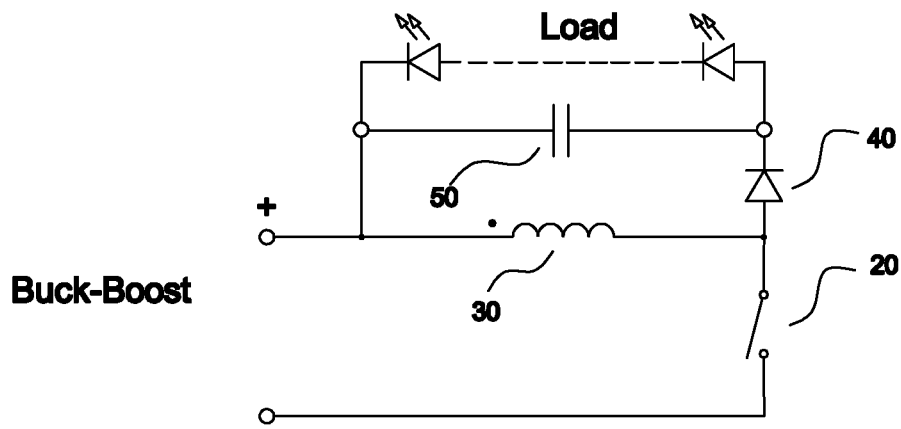
Fig. 10 - Prior Art
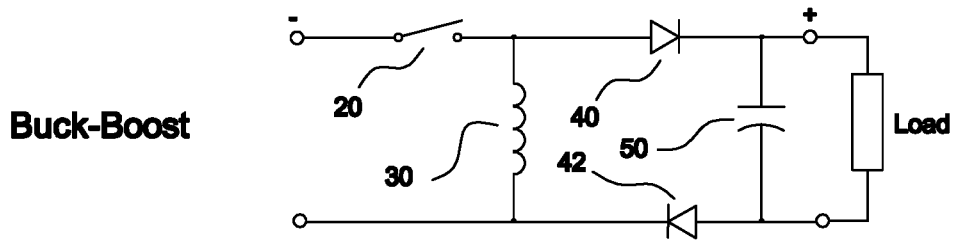
Fig. 11 - Prior Art
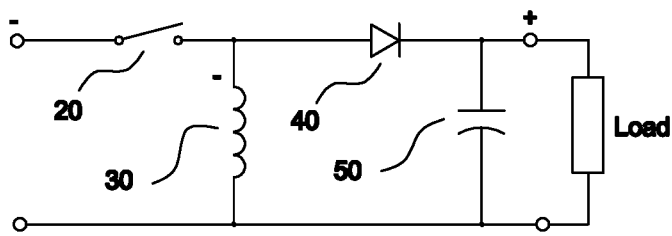
Fig. 12

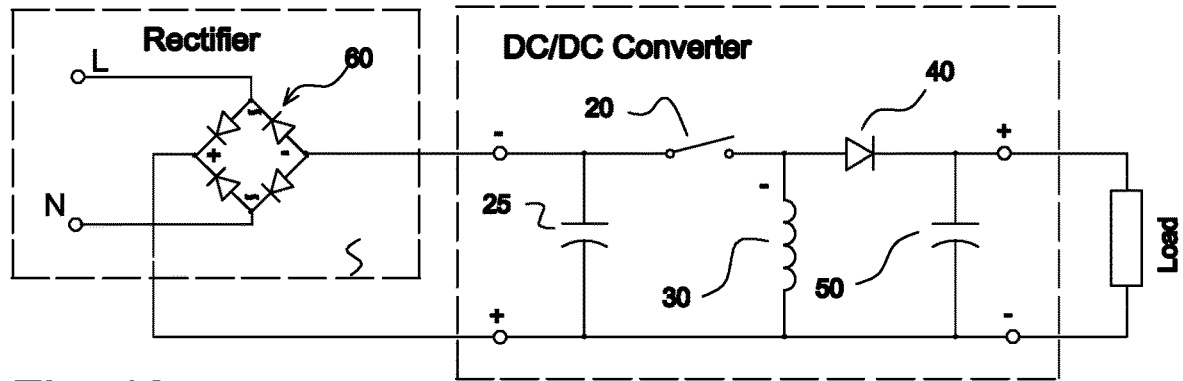
Fig. 13a
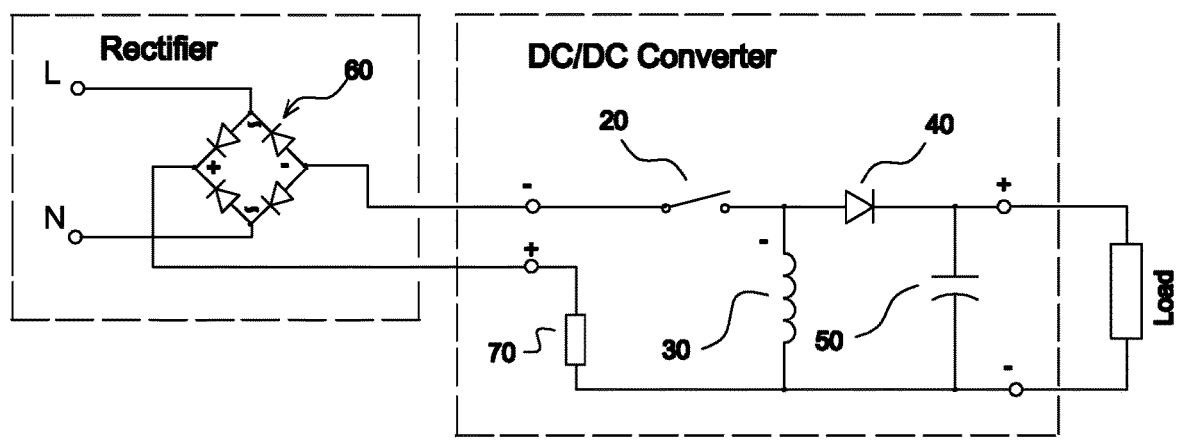
Fig. 13b
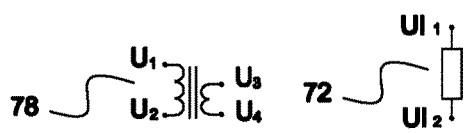 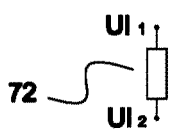 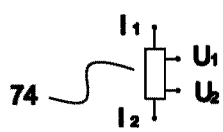 
Fig. 14a  Fig. 14b  Fig. 14c  Fig. 14d

US 11,063,513 B1

BUCK-BOOST CONVERTER WITH POSITIVE OUTPUT VOLTAGE

CROSS-REFERENCE TO RELATED APPLICATIONS

This application claims the benefits of provisional patent application Ser. No. 62/920,127 filed 2019 Apr. 11 by the present inventor.

BACKGROUND

References

The following prior art presently appears relevant:

U.S. Patents:

| Pat. No. | Kind Code | Issue Date | Patentee |
|---|---|---|---|
| 8,305,004 | B2 | Nov. 6, 2012 | Jianwen Shao |
| 9,531,282 | B1 | Dec. 27, 2016 | Alexei V. Nikitin |

Non-Patent Literature Documents

"Inverting Buck-Boost Converter", Chapter 5 in a book by Markus Zehendner and Matthias Ulmann titled "Power Technologies Handbook", copyrighted 2016 by Texas Instruments Incorporated, printed by Harte Hanks in Belgium and available as PDF publication.

"MC34167, MC33167 Inverting Switching Regulators—Step-Up/Down 5.0 A"—a ON Semiconductors Application Note, page 12, November, 2005—Rev. 7.

TECHNICAL FIELD

This invention relates to a family of SMPS (Switched Mode Power Supplies) AC to DC power converters used to improve a power factor of electric devices that can be supplied by a DC power. In particular, it relates to one-phase, minimal configuration, one-stage non-isolated AC/DC converter topology.

PRIOR ART

1. Introduction

Electronic Power Factor Controllers further referred as PFCs are dedicated implementations of a Switching Mode Power Supplies (SMPSs) configured to serve as voltage converters between a power line AC voltage and DC supplied devices designed to draw AC power with a power factor equal, or close to unity.

In particular, the PFC is an intelligent, regulated AC-to-DC (AC/DC) converter rectifying power line voltage with a minimal phase shift between a voltage and current waveforms. The PFC also limits the harmonic components incoming from a power line, while minimizing generation of its intrinsic harmonics occurring during the conversion.

A minimal configuration of converter's power components is classified as a topology. Depending on circuits' configurations the topologies are classified depending on their principles of operations and resulting performance parameters.

The topologies range from simple, one-stage, one-step conversion circuit, to multi-stage circuits dividing the conversion process on several steps where these steps can be performed by separate dedicated modules. The simple topologies are further classified as non-isolated topologies having a galvanic connection between their AC input and DC output, and isolated topologies, having no connection between their AC and DC parts. Since an objective of this invention is improving a simple, one-stage switch-mode power supply, the following discussion, unless said otherwise, should be understood as relating to such limited circuit configurations.

2. Description of the Related Art

A simple SMPS converter can be considered as a device made of an AC rectifier and a DC/DC converter. The rectifier is changing a sinusoidal AC power line voltage into a series of uni-polar half-sine voltage pulses. These pulses, usually smoothed by some filtering are fed into the DC/DC converter input.

A minimal configuration of DC/DC voltage converter usually includes an active switch, an inductive energy storage element further referred as an inductor, an output diode, and an output capacitor.

When the DC/DC converter gets its input DC voltage from an output of the AC rectifying device, it becomes an AC/DC converter. The AC/DC converter designed to get its input from a power line, can function as a Power Factor Controller (PFC).

A minimal configuration AC/DC converter should include a rectifier, an active switch, an inductor, an output power diode, and an output capacitor. Assuming that the diode rectifier output half-sine pulses can be represented by their average DC voltage, the following discussion of the converters' principle of operation can apply to both AC/DC and DC/DC configurations.

The DC/DC active switch is continuously supplied by the input DC voltage. The simple DC/DC conversion process usually works through a repetitive setting the active switch On and Off to energize and de-energize an inductive storage element, further referred as an inductor. When the switch closes, the inductor stores some energy in its magnetic field. Depending on the topology, the DC/DC converter may create an output voltage in its output capacitor either during the switch On or Off times. Depending on the circuit configuration the inductor discharge path can be either direct, or through the output diode. From the output capacitor the accumulated energy is available for supplying the converter's DC output load.

The opening and closing the active switch is controlled by a series of voltage pulses provided a separate controller managing the switch opening and closing times. The process of managing a device through a series of pulses with variable On and Off times is known as a Pulse With Modulation (PWM).

Most important parameters of PFC converters are times of opening and closing of the converter's active switch, further referred as Time-On ($T_1$) and Time-Off ($T_2$). The sum of Time-On and Time-Off is termed a Switching Period T and usually measured in seconds (s), milliseconds (ms) and microseconds (µs). The reciprocity of the switching period T is termed Frequency and usually expressed in hertz (Hz), kilohertz (kHz), and megahertz (MHz).

The ratio of pulse Time-On, $T_1$ to the full cycle time ($T_1+T_2$) usually has a symbol D. This ratio is thought an important parameter in evaluation of voltage conversion systems. Each PFC topology voltage conversion ratio depends on mathematic formulas based on the D ratio, and a switching frequency f.

$$T_1+T_2=T \tag{1}$$

$$f=1/T \tag{2}$$

$$D=T_1/(T_1+T_2) \tag{3}$$

The PFCs having the same core schematics and based on the same D ratio conversion formulas are classified as topologies.

The converter's active switch, or switches are opening and closing by the Pulse Width Modulation (PWM) voltage pulses. The PWM On and Off duration times are generated by a separate controlling circuit further referred as a controller. The converter's input to output voltage relation Uo/Ui depends on above defined D ratio.

Depending on Schematics Configuration we Classify Different Main Groups of PFC's Topologies:

A non-isolated Buck topology as per FIG. 3, has voltage lowering ratio as per formula:

$$Uo/Ui=D \tag{4}$$

As per this equation where D<1, the Buck topology output voltage is always lower from its input voltage. Because of the Buck converters low output voltage, this topology is frequently applied to lighting applications.

A non-isolated Boost topology as per FIG. 4 has voltage raising ratio as per formula:

$$Uo/Ui=1/D \tag{5}$$

By the above equation where always D<1, the Boost converters always have their output voltage higher, close to double of the input voltage. This topology makes the simplest, most dependable, and least expensive PFCs. However, this topology high output voltage is frequently a limitation. For example, more and more appliances and variety of common use gadgets are built to work with line voltage range of 120-240 VAC universal line voltage. The Boost converter PFC for these voltages usually have output voltage Uo=390-400 VDC, hence this topology applications safety and components' costs are a frequent concern. For this reason, many Boost converters for the universal line voltage of 85-250 VAC frequently must have an additional down-converting module needed to scale the converters' output voltage down.

A non-isolated Buck-Boost topology as per FIG. 5 has the voltage conversion ratio as per formula:

$$Uo/Ui=-D/(1-D) \tag{6}$$

By the same above equation, and in particular, when the PWM Time_On is close to the Time_Off, the Buck-Boost converters voltage conversion ratio is close to unity. This is a very attractive feature, however the Buck-Boost negative output voltage limits this topology to applications that operate either on negative, or bipolar supply voltages.

A different configuration of a Buck-Boost topology circuit is shown in FIG. 10. This is a core version extracted from a detailed drawing of the U.S. Pat. No. 8,305,004 by Jianwen Shao. This configuration has both output terminal attached to high voltage points. However, such a circuit cannot be used in the general purpose converters needed grounding, so it is used mainly for LED lighting application.

Numerous AC/DC converters based on equation (6) were patented or published for decades to correct the classic Buck-Boost topology disadvantages. These involve topologies like SEPIC, Ćuk, and Zeta also capable of providing close to unity voltage conversion ratio, but more complex and more expensive. All the topologies utilize positive input voltages. Examples of these commonly known topologies are cited here to illustrate the range of solutions to which this invention is an improvement.

The SEPIC topology is shown in FIG. 6. Its voltage conversion rate depends on the equation:

$$U_i/U_o=D/(1-D) \tag{6a}$$

Due to adding an extra inductor and an extra capacitor to the traditional Buck-Boost topology, this topology has a positive output voltage and the conversion factor around unity, but is not a minimal component circuit.

The Ćuk topology is shown in FIG. 7. Its voltage conversion rate depends on already cited equation (6):

$$U_i/U_o=-D/(1-D) \tag{6}$$

Despite adding an extra inductor and an extra capacitor to the traditional Buck-Boost topology, this upgrade as per the reference [0002] still has a negative output voltage and is not a minimal component circuit.

The Zeta topology is shown in FIG. 8. Its voltage conversion rate also depends on the above equation (6a). Due to adding to the traditional Buck-Boost an extra inductor and an extra capacitor, this topology has a positive output voltage and the conversion factor around unity, but still is not a minimal component circuit.

A minimal components circuit of the Buck-Boost topology was published in U.S. Pat. No. 8,305,004 by Jianwen Shao. It has a voltage conversion ratio around unity, but cannot be proposed as a general purpose converter. The general purpose converter should have one output terminal locally grounded like, for example, the Boost topology. The simplified circuit of FIG. 10 extracted from the patent's detailed drawing shows this circuit having both output terminals on the high potential path. Because of this limitation this circuit is frequently applied to supplying a LED diode chain lighting application.

A general purpose, minimal configuration converter having positive output voltage with a voltage conversion ratio closed to unity should be made of one-switch, one inductor, one-diode, and one capacitor topology. In addition, the output voltage negative terminal should allow for equipotential connection to the load device DC local grounding.

The above review of simple one-stage non-isolated topologies shows that none of the reviewed circuits can be used as a minimal configuration general purpose Buck-Boost converter, so such an optimal topology still needed to be invented.

SUMMARY OF THE INVENTION

The invention provides an alternative topology of a PFC circuit for providing power factor correction. The circuit is a minimal configuration power factor controller converting a bi-polar AC voltage to a positive DC voltage.

The circuit is made of an AC bridge rectifier attached to a DC/DC converter in such a manner that the rectifier output negative half-sine pulses serve as the DC converter input voltage. The DC converter converts these pulses into a positive input voltage with a conversion factor equal or close to unity. The circuit may have its negative output terminal grounded.

BRIEF DESCRIPTION OF THE INVENTION

This invention is contrary to the teaching of the prior art, that is, the invention goes against the prior art assumption that Buck-Boost converter should convert a positive input voltage into a negative output voltage. The paradigm challenged by this invention continues to live across the relating instructional and application areas. Two examples such of a practice are cited in this application Non-patent Literature Documents. This paradigm established across the industry was an inhibiting factor to minimize converters' costs because the manufacturers had to use more expensive parts suited for about twice of the invention's output voltage This invention does not change the principle of operation of the Buck-Boost converter topology that was known and used through decades. It still uses equation (6) as its measure of voltage conversion ratio and reverses the Buck-Boost topology input voltage polarity. To demonstrate benefits of the invention over the prior art, it is compared to the classical Buck-Boost topology example and other numerous simple, one-stage topologies. These topologies were published by Markus Zehendner and Matthias Ulmann in a book "Power Technologies Handbook", copyrighted in 2016 by Texas Instruments Inc. and printed by Harte Hanks in Belgium. This book is available TI web page with a slyu036.pdf signature. It was selected as a reference because it can be considered as a close-to-date encyclopedia of one-phase power factor controllers. The prior art schematics of FIG. 2 up to FIG. 8 are based on this book illustration, but have the MOSFET transistor symbols replaced with more general switch symbols.

This invention one-stage, non-isolated, inverting Buck-Boost PFC core topology is presented in FIG. 1, and later in FIG. 12. As mentioned, the term "core topology" stands for a minimal configuration of the converter's power components. Within this general term, for example, a switching transistor, no matter whether MOSFET or IGBT is referred as an active On-Off switch, and its supporting parts or blocks, such as the controllers, filters or drivers are either not referred, or covered only to the minimal extent necessary to understanding the topology principle of operation.

This project is a reconfigured version of the existing topology of Buck-Boost converter. This improved topology still works on the simplified equation $$Uo/Ui<=D/(1-D) \quad (8);$$

In practice, this form of the previous equation (3) accounts for losses in the circuits base components as semiconductors, coils, and resistors, as well as added supporting elements as snubbers, thermistors etc.

The industry still needs a topology as simple, dependable, and inexpensive as the Boost topology, but with lower output voltage. This invention's applications simplicity and low costs have a potential to replace numerous Boost topology embodiments.

The prior art circuit used as a base to develop this invention is shown in FIG. 5 and later to use uniform symbols in FIG. 9. The later drawing uses uniform references for a close comparison with this invention's reconfigured circuit. The prior art circuit as per FIG. 9 presents a prior art inverting, non-isolated DC/DC Buck-Boost converter supplied with a positive input voltage and yielding a negative output voltage.

The FIG. 10 presents an option of a prior art minimal configuration Buck-Boost topology that due to having both output terminals on a high potential path cannot be used as a general purpose converter to replace the Boost topology, where beneficial.

The FIG. 11 presents a circuit being used in a U.S. Pat. No. 9,531,282 by A. Nikitin as a component of a 3-phase power factor converter. This drawing is redrawn in part from a full 3-phase circuit. In this prior art patent's specifications the Buck-Boost circuit is explicit referred as having 6 diodes (4 of which are connected in a bridge). Due to the circuit purpose as a part of larger 3-phase entity and an additional diode 42, this circuit cannot be considered as a minimal, general purpose converter.

The only minimum component circuit capable of serving as an option to substitute for the Bust converter wherever the lower positive output voltage is beneficial is this invention Buck-Boost topology presented in FIG. 13b and FIG. 15. FIG. 12 and further described in detail.

DETAILED DESCRIPTION

This new DC/DC topology shown in FIG. 12 includes the same power parts as its oldest prior art predecessor, but configured in a different manner. The invention circuit still has active switch 20, inductor 30, output diode 40, and output capacitor 50 sourcing the converter output DC voltage to the load.

The most significant difference of this invention from related prior art is supplying the converter input with a negative input voltage, as opposite to the positive input voltage of its predecessor.

This is accomplished by connecting the negative input voltage to switch 20. Switch 20 is further connected to a terminal of inductor 30, further referred as the inductor active terminal. This terminal is further connected to an anode of output diode 40. When switch 20 closes it allows the negative input voltage to energize inductor 30. Opening switch 20 causes inductor 30 to de-energize. Since inductor 30 supplying path is now broken, the only open path this inductor can discharge is to the diode 40 anode. A diode 40 cathode further conducts the voltage pulse charge to the positive terminal of capacitor 50, where the charge is stored. The capacitor 50 negative terminal is connected to the second, passive terminal of inductor 30. Depending on the design specifications, the circuit current return path can close to the converter negative input terminal either direct as per FIG. 13a, or through current sensing element 70 as per FIG. 13b and FIG. 15. The use and configurations of current sensing elements 70 are further detailed in the Preferred Embodiment description. Capacitor 50 is being charged through diode 40 only when switch 20 is open. As capacitor 50 is continuously discharged by the load current the converter output voltage is continuously averaged according to the balance of both, charging and discharging DC currents.

The above topology's explanation is very simplified, but it suffices to understand its core circuit's principle of operation. Those interested in detailed analysis of this topology will find the equations needed to determine the component parameters in Chapter 5 of the cited TI book.

It has to be noted, that the parameters discussed here and calculated in the above mentioned book and are simplified. These are not ideal and have a many additional parameters not commented in the circuits' principle of operation. Such parameters include e.g. junction capacitance of diodes and transistors, stray capacitances and leak inductance of coils and circuit wires, and many others. These additional LCR parameters combine to create multiple parasitic resonance circuits. Voltage pulses caused by fast opening and closing of active switches generate complex transition states usually appearing as high frequency ringing wavelets. These wavelets' peaks are capable of rising voltage above the components' safe levels. A variety of different snubbers elements and circuits are applied to assure the circuits safety and stability. All the transients and their countermeasures are very common, but since they are not topology specific, they are not needed to understand this invention and will not be further addressed.

Attaching an AC rectifier to the input of a DC/DC converter makes this assembly an AC/DC converter and allows using it as a Power Factor Controller. The AC/DC rectifier is usually made of a diode bridge also known as a Graetz rectifier. For high power applications, the bridge diodes can be replaced by controlled switching elements such as thyristors, MOSFET transistors or IGBT transistors. Also, all AC/DC rectifiers utilize a variety of harmonics filtering assemblies on the bridge input and output. This proposed Buck-Boost AC/DC converter embodiments show the rectifier example as made of the diode bridge with, or without of filtering circuits, but these are not topology specific and can vary with different embodiments.

An example of a simple input harmonic filter is shown in FIG. 16. The filter made of capacitor 64 and choke 62 dampens the power line harmonics coming into the DC/DC converter and prevents intrinsic harmonics generated in process of voltage conversion to travel to the power line.

The rectifier connection is denoted in FIG. 13*a*, FIG. 13*b* and FIG. 15 where the bridge has a symbol 60. To operate as an AC/DC converter, the added rectifier is energized from the AC power line hot terminal L and returns its AC current through the line neutral terminal N. As a result of the rectifying process, on bridge 60 output DC terminals appears a pulsing half-sinusoidal negative voltage. This voltage is presented in FIG. 2 as voltage −Ui.

Bridge 60 is further connected in such a manner, that its output positive terminal made of a diode pair cathodes supplying in the earlier topologies the core converting circuit, is now grounded. The bridge negative terminal made of a diode pair anodes usually grounded in earlier topologies is now used to supply the DC/DC converter switch 20 with the rectified negative voltage. This voltage can be either rectified half-sinusoids as depicted in FIG. 2. Since the circuit still operates as an inverting Buck-Boost converter, its negative input voltage is further converted with a desired voltage conversion ratio into a positive output voltage that was an objective of this invention.

Preferred Embodiment

A variety of different designs can be built of the Buck-Boost topologies. These designs vary widely, and depend among others, on modes of how the active switches are timed, thus, how the converter's inductor charge and discharge currents behave when keyed. If the inductor charging and discharging currents flow continuously, the converter works in Continuous Conduction Mode (CCM). If the inductor current regularly stops after each discharge, the converter works in Discontinuous Conduction Mode (DCM). The topology of this invention can work in both, CCM or DCM modes, but their PWM controller circuits vary. Since the invention topology is the same for both conduction modes, no related specifics need to be further addressed.

Two examples are shown how to build the invention embodiments. By any reason this patent extents cannot be limited to, or by the following examples or their elements.

The first example is shown in FIG. 16. It is a simple converter intended for inexpensive or experimental applications.

The embodiment consists of two modules: a rectifier, and a DC/DC converter. The rectifier is made of a four-element diode bridge and a simple harmonic filter consisting of capacitor Cf and split-winding choke Lf. The diode bridge DC positive terminal is grounded and its negative terminal is supplying the DC converter.

The DC/DC converter is made of a power transistor Q1 serving as an active switch, an inductor L serving as a pulse energy storage, a fast power output diode D2 serving as an output pulse rectifier, and a large capacitor C2 accumulating and filtering the converter pulses' energy.

A PWM controller is used to key the MOSFET Q1 On and Off with a square wave with a frequency of choice in a range tens kilohertz and voltage close to 12 V.

The switch Q1 is a N-MOSFET power transistor placed in series within a high voltage path. The Q1 source terminal is supplied by voltage Ui from the negative terminal of diode bridge DBr. This voltage can be further smoothed by the input capacitor C1. Transistor Q1 is switched On and Off by a pulse train voltage generated by the controller Ctr circuit. The PWM On and Off states and their durations ratio work preferably in the DCM mode and determine the overall circuit's DC output voltage.

The components parameter values can be calculated from Chapter 5 of the mentioned TI reference book or from an application note for a commercially available Power Factor Controller, likely a simplest IC offered for the Boost PFC applications.

Due to substantial difference of potential between the Q1 gate and the local ground, the keying PWM pulse are provided through a commercially available small pulse transformer PTr.

Because of this circuit's simplicity, it is intended for applications working in stable supply and load conditions. For such an environment, the PWM controller can be any source of a rectangular wave pulse train capable of delivering about 10V pulses on the PTr secondary side.

It is necessary to remember that between the circuit local ground and the power line Neutral N is a potential difference close to a half of the power line AC voltage, so appropriate measures must be taken to prevent accidental short circuits.

A more complex circuit capable of working in diversified supply and load conditions is shown in FIG. 17. This circuit has means of an output voltage stabilization and protection the circuit against the elements overcharging currents. This is an upgrade of the FIG. 16 circuit achieved through using a more complex PFC controller IC and a few extra supporting parts.

This circuit core topology works exactly as described for the previous embodiment. The upgrade come through a more complex PWM controller Ctr. This controller can be made of any commercially available integrated chip used in other traditional Boost PFC.

As above, the transistor Q1 drain is connected to the active terminal of the inductor L, and to the anode of output power diode D2. Unless the controller Ctr circuit has its own dedicated low voltage DC power supply, an additional low power winding can be wound on the inductor L, forming a transformer to generate a pulse voltage further rectified and filtered to supply the controller.

Such an inductor is shown in FIG. 15*a*. If this is used, the terminals $U_1$ and $U_2$ serve as the inductor L active and passive terminals accordingly, and the secondary winding terminals $U_3$ and $U_4$ provide a low voltage further rectified and filtered to supply the controller. One should remember, that this supply option may need an additional circuit to start the controller before the inductor L gets energized.

This embodiment control circuit has two feedback loops to regulate and stabilize the PFC output voltage amid of varying input AC voltage, power elements' parameters, or the DC output current. The first loop has a task to stabilize the output DC voltage within the range currents from open circuit to full load. The R1 and R2 voltage divider allows the controller Ctr sensing the output DC voltage changes under varying load conditions and other voltage drops. According to these changes, the controller adjusts the PWM On and Off times to key the transistor Q1 in a manner to restore the output voltage to its designed value. Please note, that some marketed controller chips get their output and input voltage sensed by the currents' rather then voltages' signals. If this is the case, the R1 has very high resistance value, and the R2 resistor is absent.

The second loop has a task to protect the converter power components against thermal and electrical effects of the excessive loads or faults causing the converter to draw excessive current. This loop can be omitted in applications drawing small power, or having other means limiting the current draw. The voltage drop caused by current sensing element shown as resistor Rs is provided to the controller respective input. Upon detecting an excessive current draw the controller applies a protective action that may include changing or stopping generation of its PWM pulse train. The current sensing element parameters depend on the embodiment's power rating. In low power applications, a standard resistor as per FIG. 15b with a resistance of hundreds milliohms is sufficient. For currents of tens amperes and up, a Kelvin resistor as per FIG. 15c with separate current and voltage terminals can be a preferable choice.

Also, because the current drawn by the converter has a sinusoidal AC form an inductive sensor for high power converters can be applied. Such a sensor shown in FIG. 15d has usually one turn, or just a wire-through as a primary winding, and a secondary coil of hundreds turns over an air or magnetic core.

BRIEF DESCRIPTION OF THE DRAWING

The following drawings serve to illustrate the invention basic principle and are limited to cover only the features necessary for understanding the topology principles of operation.

FIG. 1 shows this invention principle of operation;
FIG. 2 shows a waveform of a rectified input voltage of the DC/DC converter module;
FIG. 3 shows a prior art Buck Converter Topology;
FIG. 4 shows a prior art Boost Converter Topology;
FIG. 5 shows a prior art Buck-Boost Topology;
FIG. 6 shows a prior art SEPIC Converter Topology;
FIG. 7 shows a prior art ĆUK Converter;
FIG. 8 shows a prior art Zeta Converter;
FIG. 9 shows a prior art DC/DC converter module annotated for reference,
FIG. 10 shows a DC/DC converter module used for LED lighting;
FIG. 11 shows a prior art DC/DC converter used as a part of 3-phase circuit;
FIG. 12 shows this invention DC/DC converter;
FIG. 13a shows an AC/DC topology having an AC rectifier and the DC/DC converter;
FIG. 13b shows the AC/DC converter topology with a current sensing element;
FIG. 14a shows a transformer used as an inductor;
FIG. 14b-14d show different configurations of a current sensing element.

Figure 15:
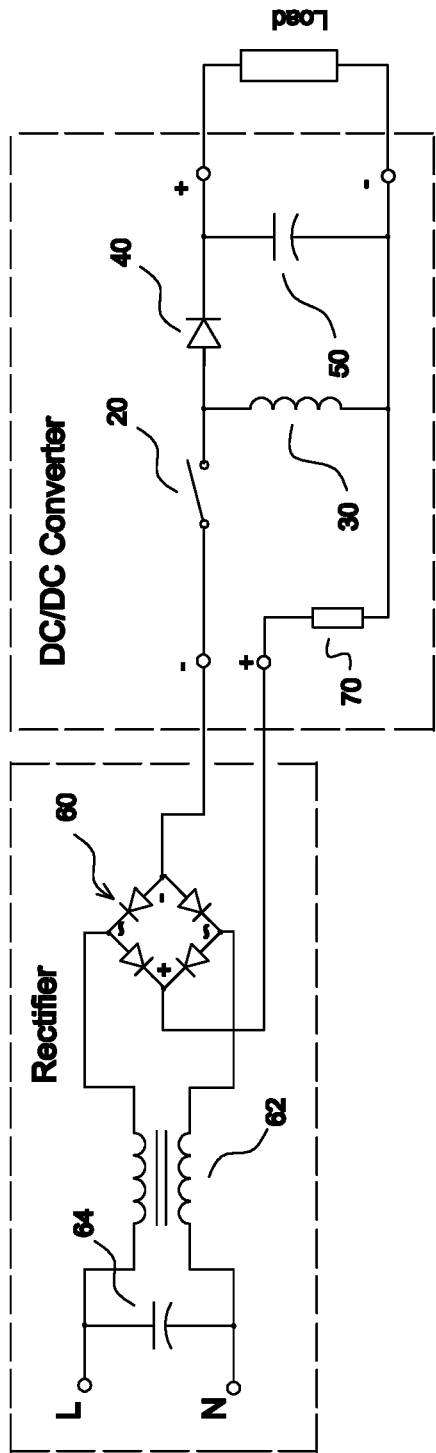
FIG. 15 shows the AC/DC converter with an EMI Filter.
Figure 16:
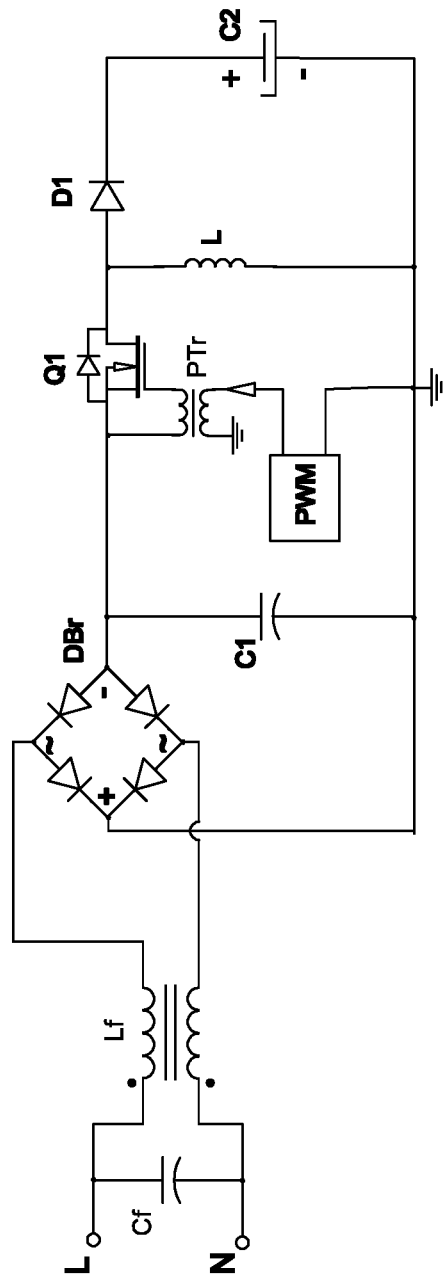
FIG. 16 shows an example of a simple PFC controller AC/DC embodiment.
Figure 17:
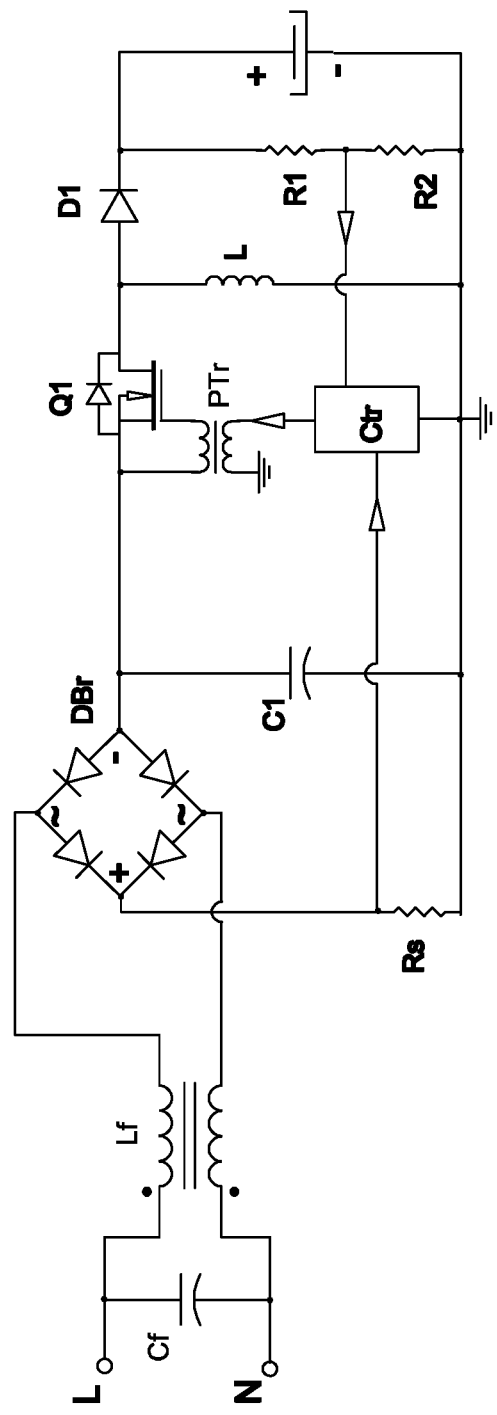
FIG. 17 shows an example of an upgraded PFC controller AC/DC embodiment.

I claim:

1. A DC to DC converter topology comprising an input terminal and a return terminal, said input terminal supplied with a negative voltage, and said return terminal grounded, this converter further comprising: an active power switch, an inductor, an output diode, and an output capacitor,
   said active power switch being a power transistor, this active power switch being supplied from said input terminal of said DC to DC converter,
   said inductor having an entry terminal and an exit terminal,
   said output capacitor having a positive terminal and a negative terminal,
   said switch energizing terminal having a connection to the entry terminal of said inductor, this terminal having further connection to an anode of said output diode,
   a cathode of said output diode having connection to the positive terminal of said output capacitor,
   said negative terminal of said output capacitor having connection the exit terminal of said inductor, said exit terminal of said inductor further having connection to said return terminal of this DC to DC converter.

2. An AC to DC converter comprising the DC to DC converter of claim 1, the AC to DC converter further comprising input rectifying means,
   said input rectifying means comprising a rectifying bridge,
   said rectifying bridge comprising AC terminals, a DC positive terminal, and a DC negative terminal,
   said rectifying bridge having one AC terminal receiving power from an energizing terminal of an AC power line, and another AC terminal returning power to a neutral terminal of the AC power line,
   the negative terminal of said rectifying bridge is connected to the input terminal of said active power switch,
   the DC positive terminal of said rectifying bridge is connected to the exit terminal of said inductor,
   this AC to DC converter configured to serve as a Power Factor Controller.

* * * * *